United States Patent
Seigler et al.

(10) Patent No.: US 9,916,851 B1
(45) Date of Patent: Mar. 13, 2018

(54) PREHEAT STRATEGY DURING SEQUENTIAL WRITING

(71) Applicant: Seagate Technology LLC, Cupertino, CA (US)

(72) Inventors: Michael Allen Seigler, Eden Prairie, MN (US); Zoran Jandric, St. Louis Park, MN (US); Tae-Woo Lee, Eden Prairie, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/608,146

(22) Filed: May 30, 2017

(51) Int. Cl.
*G11B 5/02* (2006.01)
*G11B 7/1267* (2012.01)
*G11B 5/012* (2006.01)
*G11B 19/04* (2006.01)

(52) U.S. Cl.
CPC ............ *G11B 7/1267* (2013.01); *G11B 5/012* (2013.01); *G11B 5/02* (2013.01); *G11B 19/046* (2013.01)

(58) Field of Classification Search
CPC .... G11B 2005/0021; G11B 2005/0005; G11B 5/314; G11B 5/3903; G11B 11/10543; G11B 11/10532; G11B 11/10554
USPC .... 360/59, 313, 75; 369/13.13, 13.32, 13.33
See application file for complete search history.

(56) References Cited

U.S. PATENT DOCUMENTS

| | | | |
|---|---|---|---|
| 4,737,798 A | 4/1988 | Lonis et al. | |
| 4,916,465 A | 4/1990 | Van Tongeren et al. | |
| 8,854,930 B1 | 10/2014 | Clinton et al. | |
| 9,135,937 B1 | 9/2015 | Goulakov | |
| 9,281,659 B1* | 3/2016 | Tatah | H01S 5/06804 |
| 9,418,691 B2 | 8/2016 | Peng et al. | |
| 2015/0340053 A1 | 11/2015 | Peng et al. | |
| 2016/0087401 A1 | 3/2016 | Wessel et al. | |
| 2016/0087402 A1 | 3/2016 | Tatah et al. | |
| 2016/0189741 A1 | 6/2016 | Tatah et al. | |

* cited by examiner

*Primary Examiner* — Nabil Hindi
(74) *Attorney, Agent, or Firm* — Hollingsworth Davis, LLC

(57) ABSTRACT

Embodiments described herein involve a method comprising generating a seek command in a heat-assisted magnetic recording (HAMR) device. A first current is supplied to a laser diode of the HAMR device in response to the seek command to preheat the laser diode. The first current is insufficient to cause erasure of data on media of the HAMR device. A second current that is greater than the first current is supplied to the laser diode for writing to a magnetic recording medium of the HAMR device after executing the seek command. Preheating the laser diode reduces a likelihood of a laser mode hop occurring while writing to the medium.

20 Claims, 6 Drawing Sheets

PREHEAT STRATEGY DURING SEQUENTIAL WRITING

SUMMARY

Embodiments described herein involve a method, comprising generating a seek command in a heat-assisted magnetic recording (HAMR) device. A first current is supplied to a laser diode of the HAMR device in response to the seek command to preheat the laser diode. The first current is insufficient to cause erasure of data on media of the HAMR device. A second current that is greater than the first current is supplied to the laser diode for writing to a magnetic recording medium of the HAMR device after executing the seek command. Preheating the laser diode reduces a likelihood of a laser mode hop occurring while writing to the medium.

Embodiments described herein involve an apparatus comprising a controller coupled to circuitry configured to provide power to a laser of a write head that heats a heat-assisted recording (HAMR) medium during recording. The controller is configured to generate a seek command in a heat-assisted magnetic recording device. The controller is further configured to supply a first current to a laser diode of the HAMR device in response to the seek command to preheat the laser diode, the first current being insufficient to cause erasure of data on media of the heat-assisted magnetic recording device. The controller is further configured to supply a second current greater than the first current to the laser diode for writing to a magnetic recording medium of the device after executing the seek command. Preheating the laser diode reduces a likelihood of a laser mode hop occurring while writing to the medium.

Embodiments described herein involve generating a seek command in a heat-assisted magnetic recording (HAMR) device. A first current is supplied to a laser diode of the HAMR device substantially simultaneously with a start of the seek command. The first current is insufficient to cause erasure of data on media of the HAMR device. A second current greater than the first current is supplied to the laser diode for writing to a magnetic recording medium of the HAMR device after executing the seek command. Preheating the laser diode reduces a likelihood of a laser mode hop occurring while writing to the medium.

BRIEF DESCRIPTION OF THE DRAWINGS

Throughout the specification, reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The present disclosure is generally directed to read-write heads used in magnetic recording devices such as hard drives. In particular, this disclosure relates to heat-assisted magnetic recording (HAMR), which can be used to increase areal data density of magnetic media. In a HAMR device, information bits are recorded in a storage layer at elevated temperatures in a specially configured magnetic media. The use of heat can overcome superparamagnetic effects that might otherwise limit the areal data density of the media. As such, HAMR devices may include magnetic write heads for delivering electromagnetic energy to heat a small confined media area (spot size) at the same time the magnetic write head applies a magnetic field to the media for recording.

A HAMR read/write element, sometimes referred to as a slider, recording head, read head, write head, read/write head, etc., includes magnetic read and write transducers similar to those on current hard drives. For example, data may be read by a magnetoresistive sensor that detects magnetic fluctuations of a magnetic media as it moves underneath the sensor. Data is written to the magnetic media by a write coil that is magnetically coupled to a write pole. The write pole changes magnetic orientation in regions of the media as it moves underneath the write pole in response to an energizing current applied to the write coil. A HAMR slider will also generally include a source of energy, such as a laser diode, to heat the media while it is being written to by the write pole. An optical delivery path is integrated into the HAMR slider to deliver the energy to the surface of the media.

The optical delivery path of a HAMR slider may include a plasmonic transducer proximate a media-facing surface (e.g., air-bearing surface, contact surface). The plasmonic transducer shapes and transmits the energy to a small region on the medium. The plasmonic transducer is sometimes referred to as a near-field transducer (NFT), optical antenna, surface plasmon resonator, etc., and may include a plasmonic metal such as gold, silver, copper, aluminum, etc., and alloys thereof. The plasmonic transducer for a HAMR device creates a localized region of high power density in the media through an electromagnetic interaction. This results in a high temperature rise in a small region on the media, with the region exceeding the Curie temperature having dimensions less than 100 nm.

Figure 1A:
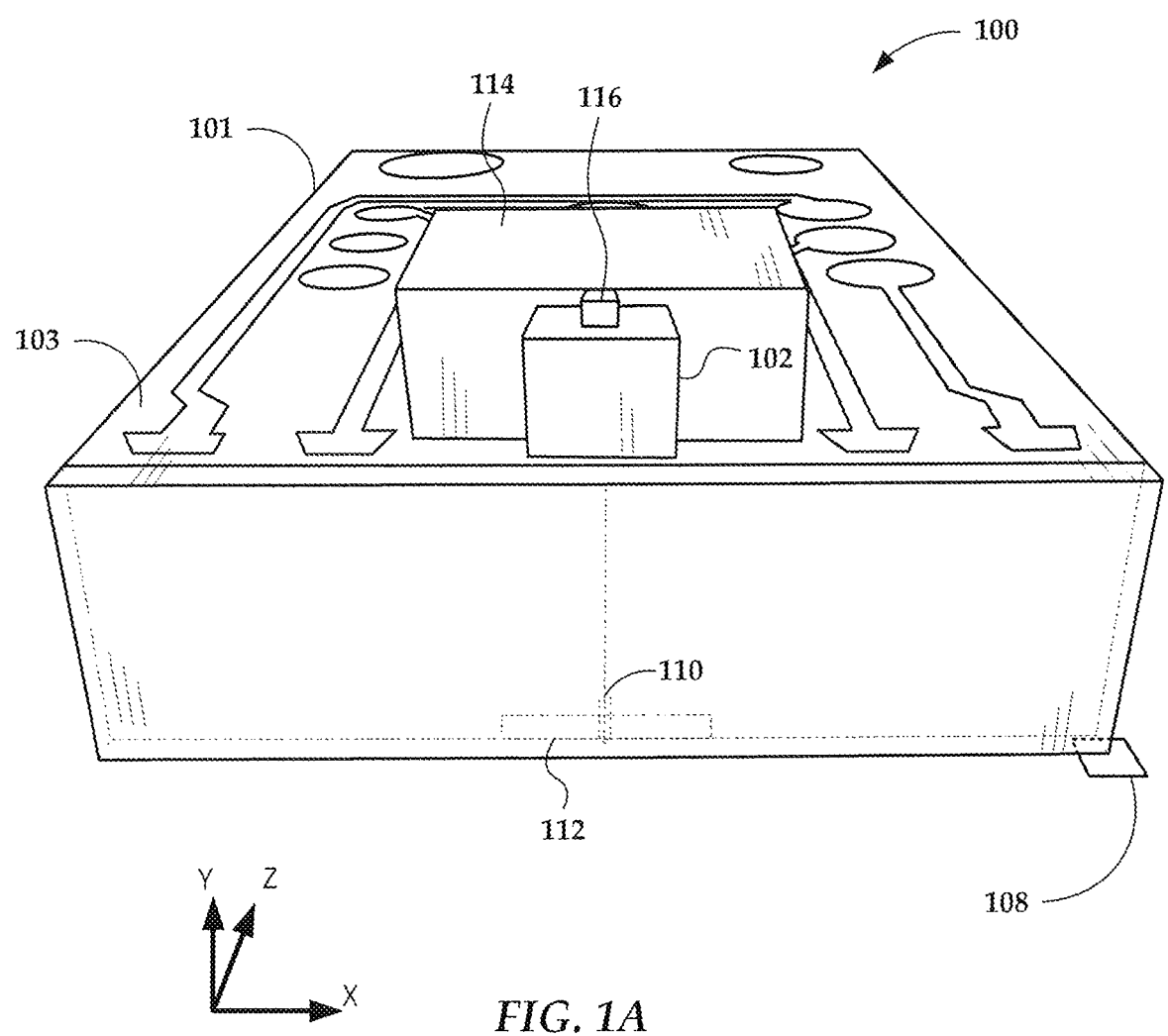
FIGS. 1A and 1B are views of a heat-assisted magnetic recording slider assembly in accordance with embodiments described herein.

In reference to FIG. 1A, a perspective view shows a HAMR read/write head 100 according to an example embodiment. The read/write head 100 includes a laser diode 102 located on input surface 103 of a slider body 101. In this example, the input surface 103 is a top surface, which is located opposite to a media-facing surface 108 that is positioned over a surface of a recording media (not shown) during device operation. The media-facing surface 108 is held proximate to the moving media surface while reading and writing data. The media-facing surface 108 may be configured as an air-bearing surface that maintains separation from the media surface via a thin layer of gas, typically air or helium, and/or their combination.

The laser diode 102 delivers light to a region within a HAMR read/write head (not shown), which is located near the media-facing surface 108. The energy is used to heat the recording media as it passes by the read/write head. Optical coupling components, such as a waveguide 110, are formed integrally within the slider body 101 (near a trailing edge surface 104, in this example not shown in FIG. 1A) and function as an optical path that delivers energy from the laser diode 102 to the recording media via a near-field transducer 112. The near-field transducer 112 is located within the read/write head and concentrates the optical energy to a sub-wavelength spot on the recording head, causing local heating of the media during recording operations.

The laser diode 102 in this example is shown as coupled to the slider body 101 via a submount 114. The submount 114 can be used to orient and affix an edge-emitting laser so that its output is directly downwards (negative y-direction in the figure). An input surface of the slider body 101 may include a grating or other coupling features to receive light from the laser via the optic fiber and/or waveguide. The read/write head 100 also includes an optical energy measurement sensor, such as photodetector 116 (e.g., a photodiode or bolometer). The photodetector 116 is configured to measure of intensity the laser light output.

Figure 1B:
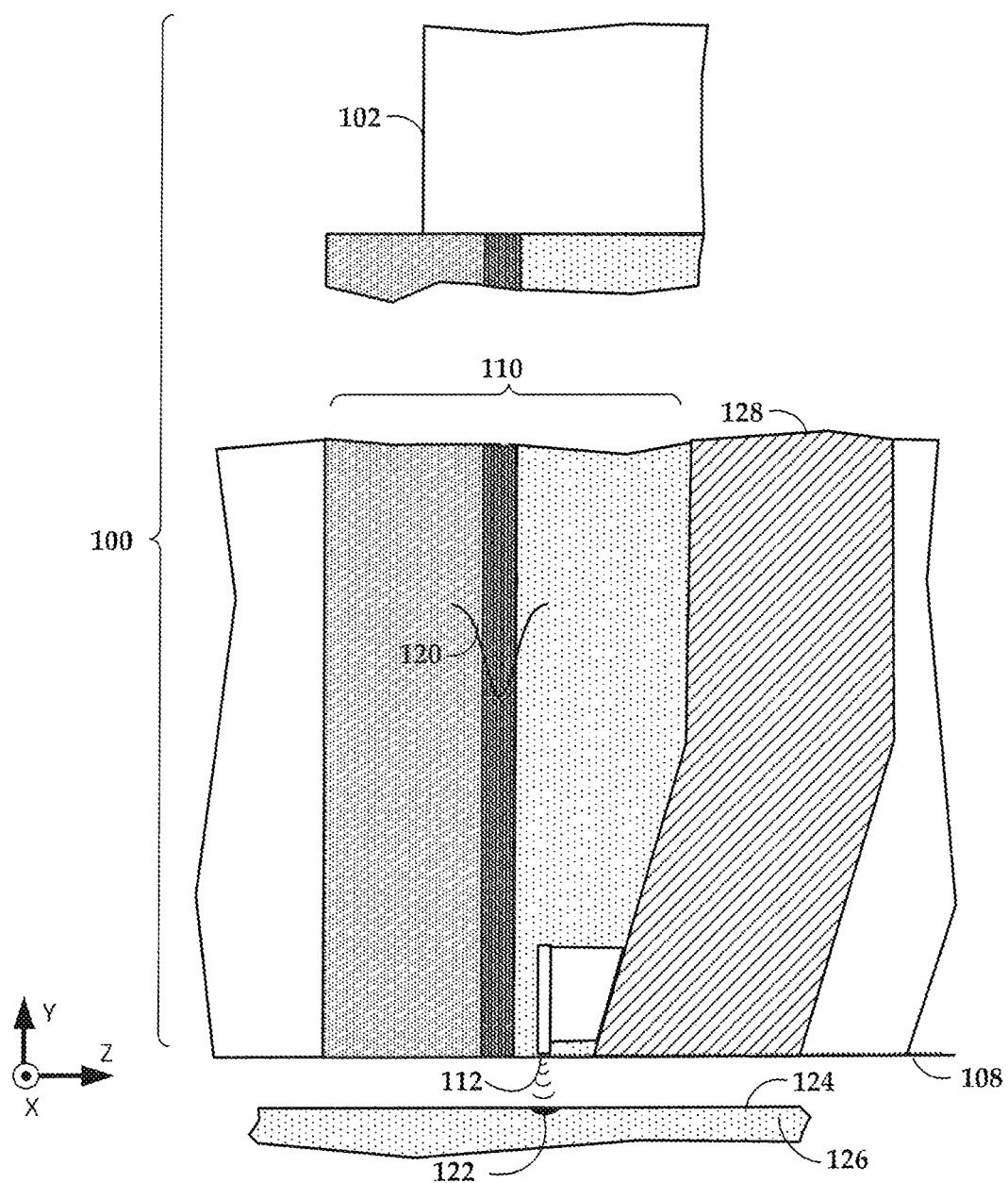

FIG. 1B shows a cross-sectional view of additional components of the read/write head proximate the media-facing surface 108. The waveguide 110 receives electromagnetic energy 120 from the laser diode 102, and couples the energy 120 to the near-field transducer 112. The near-field transducer 112 is made of a metal (e.g., gold, silver, copper, rhodium, iridium, alloys thereof, etc.) that achieves surface plasmonic resonance in response to the applied energy 120. The near-field transducer 112 shapes and transmits the energy 120 to create a small hotspot 122 on a surface 124 of recording medium 126. A magnetic write pole 128 is magnetically coupled to an electrical coil (not shown). Energizing the coil causes changes in magnetic flux through the write pole 128, which changes a magnetic orientation of the hotspot 122 as it moves past the write pole 128 in the downtrack direction (z-direction). A reader stack (not shown) may also be located near the media-facing surface 108, typically in a down track direction relative to the write pole 128.

In the HAMR implementations described herein, the laser diode may operate in at least three general modes of operation. The first mode is idle, when the laser is fully off or inactive (e.g., no applied current or a current insufficient to induce lasing). According to various implementations, between writing individual data sectors, such as during seeks or other non-writing events, the laser diode may be placed into a partially-active mode, i.e. second mode of operation. In the partially-active mode, the laser is biased with a current ($I_{bias}$) sufficient to induce lasing but insufficient to record or erase data to the medium. In the third mode, when writing data, the laser is in an active mode, where the laser is fully active with an applied current sufficient to record or erase data to the medium.

Figure 2:
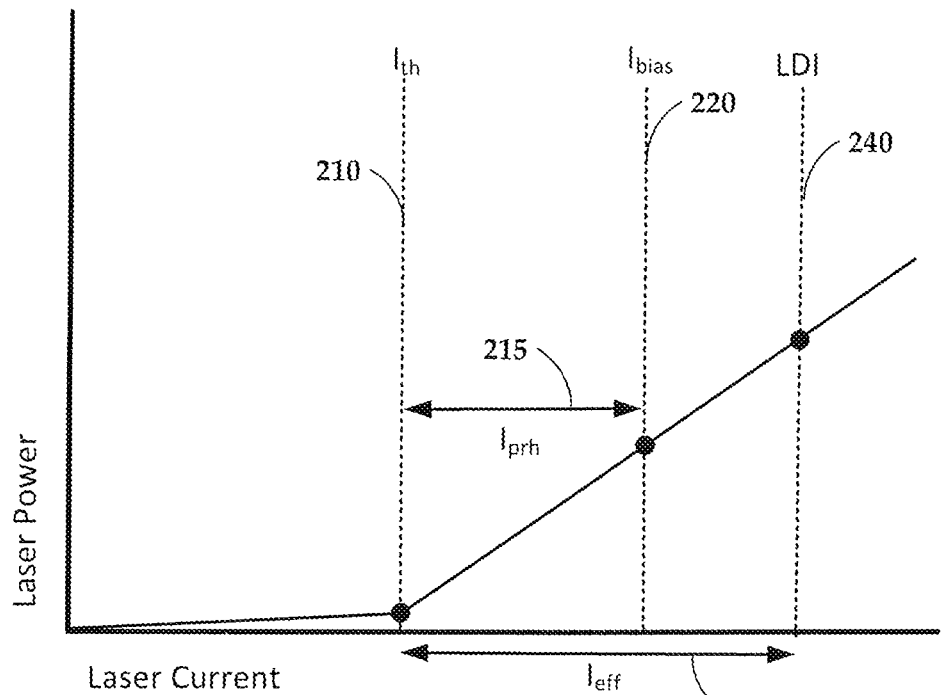
FIG. 2 illustrates the relationship between laser power and different laser current values in accordance with embodiments described herein.

FIG. 2 illustrates the relationship between laser power and different laser current values. At current levels below the threshold current ($I_{th}$) 210, there is negligible laser output because the applied current is insufficient to induce lasing and thus emit light from the laser. At current levels of $I_{th}$ 210 or greater, the laser begins to emit light. The laser is in an active mode at $I_{eff}$ 230, which represents a current sufficient to record and/or erase the media. At the current level $I_{bias}$ 220, the laser is in the partially-active mode. In some cases, $I_{bias}$ 220 is set at a constant value. For example, $I_{bias}$ may be set in the factory and/or periodically during the life of the device. According to various implementations, $I_{bias}$ 220 is adjusted to be a certain percentage or range above $I_{th}$ 210 and/or a certain percentage or range below $I_{bias}+I_{eff}$ in order to provide a bias current that does not erase or write to the media to avoid damage to servo sectors. For example, in some configurations, $I_{bias}$ 220 may be between about 5% to about 15% above $I_{th}$ 210, although this can vary due to laser design, ambient temperature, etc. According to various configurations, $I_{bias}$ 220 is closer to $I_{th}$ 210 than to the fully active current level 240 to ensure that the laser operating in the partially-active mode does not record to or erase the magnetic medium.

When the system initiates a write operation, the current supplied to the laser increases to the fully activated current. It may take a period of time to reach the fully activated current for a write operation. In some cases, the laser is preheated to a preheat current before the write operation. The preheat current is below a current that could potentially erase and/or write to the media. For example, the preheat current may be the difference between partially active current, $I_{bias}$ 220 and $I_{th}$ 210. The increase from $I_{th}$ 210 to $I_{bias}$ 220 in FIG. 2 is referred to as $I_{prh}$ 215. The total laser current is referred to as LDI 240. According to various implementations, $I_{prh}$ is calculated by using Equation 1 where $I_{eff}$ 230 is calculated by using Equation 2 and $\alpha_{prh}$ is a constant. For example, $\alpha_{prh}$ may be about 0.7.

$$I_{prh}=\alpha_{prh}\times I_{eff} \qquad \text{Equation 1}$$

$$I_{eff}=\text{LDI}-I_{th} \qquad \text{Equation 2}$$

In some cases, $\alpha_{prh}$ may be set in the factory and/or may change depending on one or more parameters of the memory device. $\alpha_{prh}$ may be selected to be as high as possible without causing $I_{bias}$ to be at or above a temperature that could cause erasure of the media. According to various embodiments, $\alpha_{prh}$ may be chosen such that $I_{bias}$ is a predetermined percentage below a temperature that could potentially cause erasure of the media. In some cases, $I_{prh}$ may be calculated by using Equation 3.

$$I_{prh}=I_{bias}-I_{th} \qquad \text{Equation 3}$$

Even a small change in the laser's power while recording can have significant effects on the HAMR recording process. This may cause bit error rate (BER) degradation on a written track as well as adjacent tracks on either side. In addition to changes due to environment or aging, the laser in a HAMR drive can undergo what is sometimes called a mode hop. A mode hope results in a sudden change in optical power. When the laser power increases during a write operation, for example, there is potential for BER degradation on the adjacent tracks (and possibly the next sectors on the track currently being written). When the laser power decreases there is potential for BER loss on the currently written track.

According to various implementations described herein, the laser is preheated to reduce the likelihood of a mode hop. The preheat may be initiated in response to a seek command that is generated by a memory controller. The laser preheat may be initiated upon receipt of the seek command. During the laser preheat, the laser current supplied to the laser diode is increased to a first current. For example, the first current may be set to $I_{bias}$. In some cases, the laser is preheated to a maximum of $I_{bias}$ during the seek instruction to avoid erasing or writing to the media. After the seek operation is complete, the current raises to a second current sufficient to write to the media such as LDI. According to embodiments described herein, preheating the laser diode reduces a likelihood of a laser mode hop occurring while writing to the medium. In some cases, the first current is supplied substantially simultaneously with a start of the seek command and/or upon generation of the seek command. In some cases, the first current is supplied a predetermined amount of time after a start of a seek command.

Figure 3:
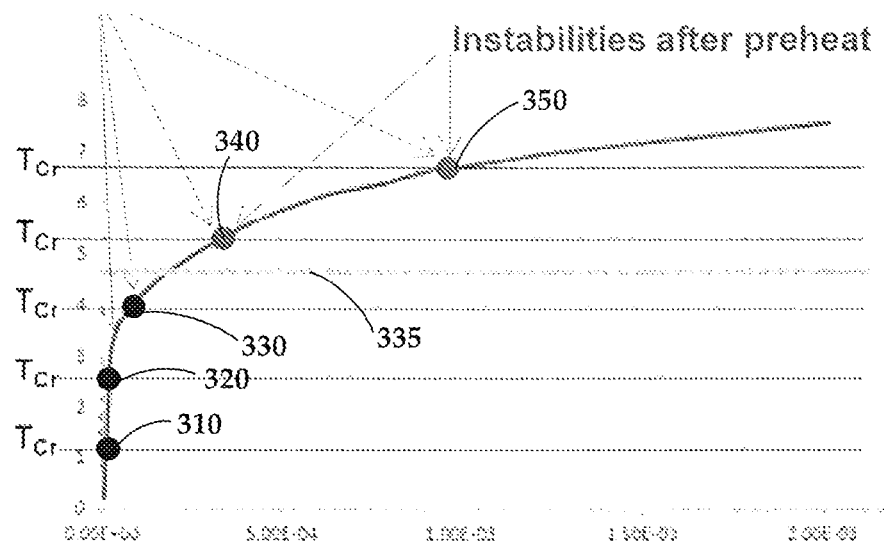
FIG. 3 shows the temperature versus time for a laser diode in accordance with embodiments described herein.

According to various implementations, when the laser heats up in response to a write request, instabilities in the system may arise. These instabilities may occur at specific critical temperatures ($T_{Cr}$). These critical temperatures may be different for every laser diode and/or may depend on various factors such as the environment, for example. FIG. 3 shows the temperature versus time for a laser diode. In this example, there are five critical temperatures 310, 320, 330, 340, 350. When heating up a laser diode, the temperature rises quickly at first and then starts to level off. The critical temperatures are substantially equally spaced. Thus, more critical temperatures are experienced in a short period of time at the beginning of the heat-up process because the system is heating up more quickly than at later times. Therefore, it can be observed that the higher the slope of the temperature rise in time, the higher the probability of reaching a higher number of critical temperatures. If the system can start preheating the laser diode to $I_{bias}$ 335 before the write process starts, the number of possible transitions though critical temperatures is reduced. If a preheat takes place and the system is heated to temperature shown in FIG. 3 the first three critical temperatures 310, 320, 330 are reached before the write operation starts and only two critical temperatures 340, 350 are experienced during the write operation. A system without a preheat would experience all five 310, 320, 330, 340, 350 in this example.

Figure 4:
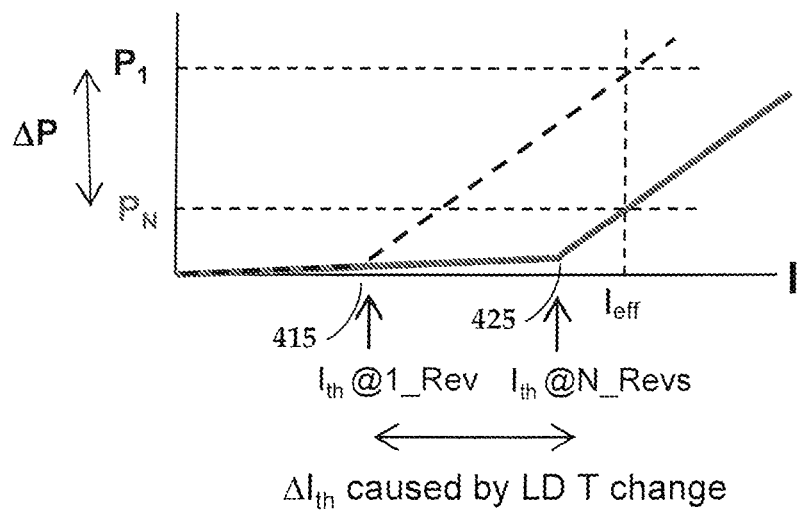
FIG. 4 illustrates the shift in a threshold current ($I_{th}$) while at one revolution and at N revolutions in accordance with embodiments described herein.

A preheat may also reduce the amount and/or likelihood that $I_{th}$ will shift during a write operation. A shift of $I_{th}$ may be problematic if $I_{th}$ is shifting and not enough power is provided to the laser to write to the media. Lack of sufficient power can lead to an increase in the bit error rate (BER). FIG. 4 illustrates the shift in $I_{th}$ from one revolution to N revolutions. As can be observed, $I_{th}$ shifts from the $I_{th}$ current at one revolution 415 to a current that is much closer to LDI at N revolutions 425. Because of this shift, the fully active current for writing also increases. A system utilizing a laser preheat in accordance with embodiments described herein may experience a smaller shift in $I_{th}$ and resulting BER during a write operation in comparison with a system that does not preheat the laser. According to embodiments described herein, LDI is chosen so that the current that is provided to the laser diode is sufficient to cause optimal power output (P1). When $I_{th}$ shifts from 415 to 425, the power changes at an identical LDI from P1 to PN. Because of the reduced power output at LDI, the system sees a reduced amount of energy provided by the laser diode at N revolutions versus the laser output at one revolution.

Figure 5:
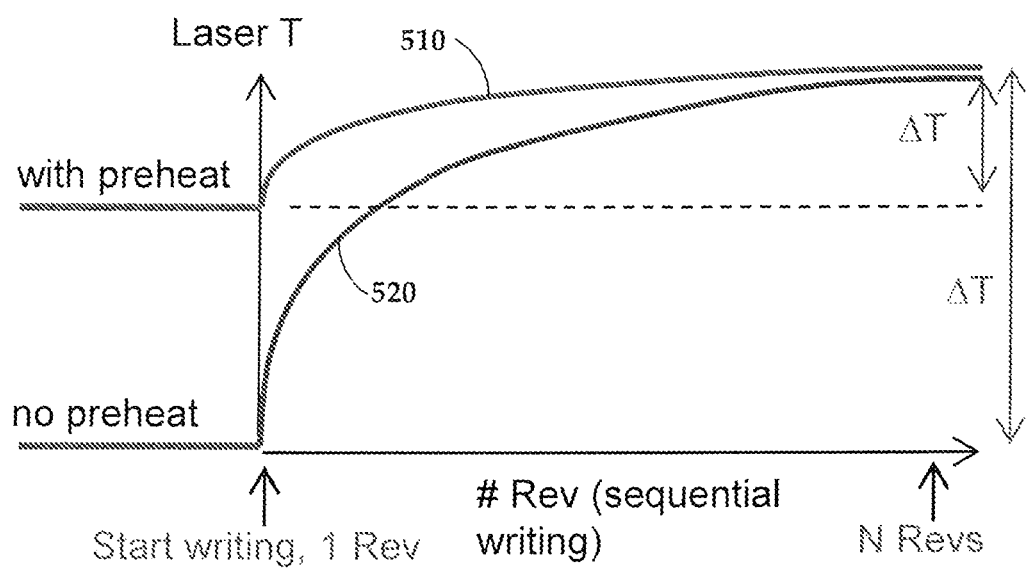
FIG. 5 illustrates the laser temperature with a system having no preheat and a system utilizing a preheat before the write operation in accordance with embodiments described herein.

One way to initiate a preheat is to start preheating upon the receipt of a seek command. FIG. 5 illustrates the laser temperature with a system having no preheat 520 and a system utilizing a preheat 510 before the write operation. FIG. 5 shows that the change in temperature after the system starts writing is substantially less for the system having a preheated laser and therefore there is less opportunity for a shift in $I_{th}$. The reduction of $I_{th}$ shifts leads to reduced laser power output change during sequential writing and thus a lower BER loss.

The length of the preheat and may be substantially directly proportional to the length of the seek operation. For example, when the seek operation is short, the effect of the preheat current will be small, and thus the laser will need to heat up a greater amount during the writing process than for a situation in which the seek operation is long. The start time of the preheat may depend on the length of the seek command. For example, if the seek command is for a seek that is e.g., 1000 tracks, the preheat may begin after a predetermined amount of time. For example, the preheat may begin between about 960 µs and about 1600 µs before the end of the seek is complete. In some cases, the preheat may begin substantially at the same time as the seek command is received and/or the start of the seek command regardless of the length of the seek.

Figure 6:
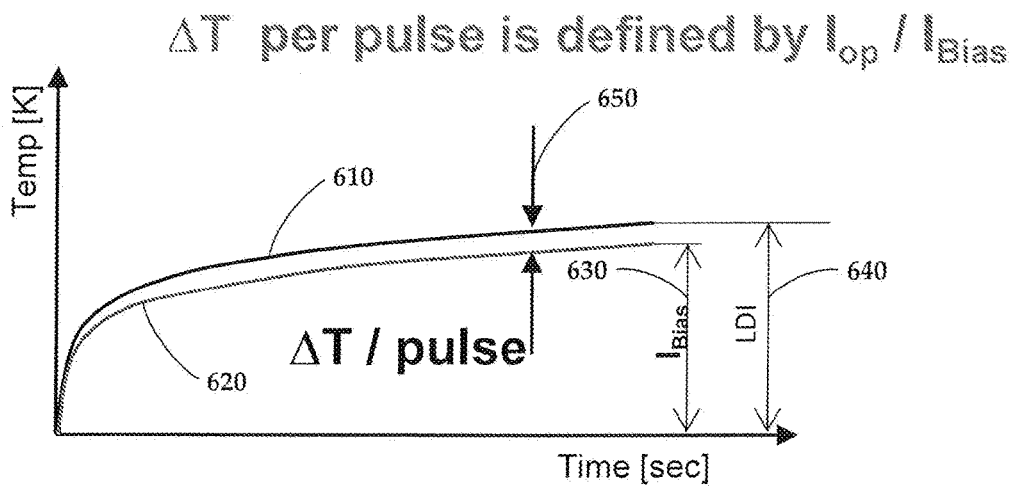
FIG. 6 illustrates the change in temperature per pulse in accordance with embodiments described herein.

The value of $I_{bias}$ may have an impact on the likelihood for mode hopping. For example, a relatively higher $I_{bias}$ may lead to fewer instabilities because the laser current does not have to increase as much during a write process than for a system that has a relatively lower $I_{bias}$ value. According to various implementations, $I_{bias}$ is set to be a certain percentage below a current that would cause erasure of the media and may change depending on the current conditions of the device. For example, $I_{bias}$ may be set to a relatively higher value if $I_{th}$ increases and may be adjusted to a relatively lower value if $I_{th}$ decreases. A system having a higher $I_{bias}$ and therefore a higher preheat temperature may have fewer instabilities during the write process because there may be less diode temperature increase during the write process. The value of $I_{bias}$ may be balanced to reduce chances for erasure. For example, $I_{prh}/I_{eff}$ may be set to a value in a range of about 0.5 to about 0.8 or a range of about 0.6 to about 0.8. $I_{bias}$ may be set to a high enough current to reduce instability, but not so high that it causes erasure as the head passes over the media. When a command to write is received, the laser diode current increases above $I_{th}$ from $I_{bias}$ to LDI. As the current increases, the system experiences temperature pulses. A larger current increase results in a larger temperature pulse. FIG. 6 illustrates the change in temperature per pulse 650. The magnitude of the pulse can be calculated with thermo-mechanical model and is proportional to $I_{eff}-I_{prh}$.

Figure 7:
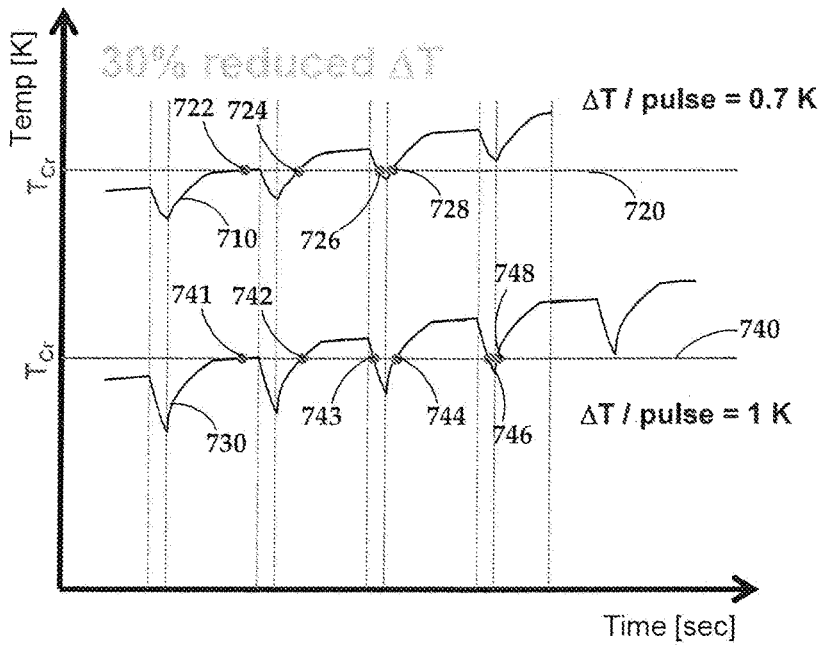
FIG. 7 illustrates the change in temperature per pulse in a system having an elevated laser diode bias current ($I_{bias}$) and a system that does not have an elevated $I_{bias}$ in accordance with embodiments described herein.

FIG. 7 illustrates the change in temperature per pulse in a system having an elevated $I_{prh}$ and a system that does not have an elevated $I_{prh}$. For this example, the change in temperature per pulse is about 1K for a system that does not have an elevated $I_{prh}$. Increasing $I_{prh}$ in this example causes a 30% reduction in the change in temperature per pulse. For example, the temperature pulse for an increased $I_{prh}$ value may be less than or equal to about 2K or less than or equal to about 1K. In some cases, the temperature per pulse for an increased $I_{prh}$ value may be less than or equal to about 0.7K. The magnitude of the pulse while the system heats up may impact the number of instabilities in the system. As described previously, the system may experience instabilities every time that a critical temperature is reached. The critical temperatures in FIG. 7 are represented by line 720 for the system having an elevated $I_{prh}$ and line 740 for the system having a standard or no $I_{prh}$. When the temperature passes over the respective critical temperature lines 720, 740, the system experiences instabilities. The number of instances 741, 742, 743, 744, 746, 748 that represent passing over the critical temperate line 740 are greater for the system having a standard or no $I_{prh}$ than the number of instances 722, 724, 726, 728 that represent passing over the critical temperature line 720 for a system having an elevated $I_{prh}$. At a higher starting $I_{prh}$, the critical temperature is reached four times versus six for the lower $I_{prh}$ in this example.

Figure 8:
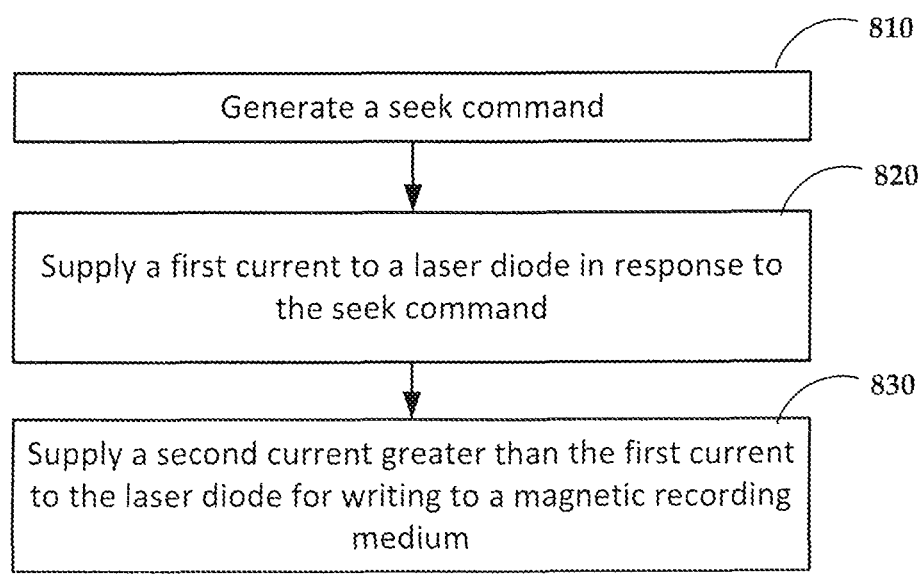
FIG. 8 illustrates a method for preheating a heat-assisted magnetic recording (HAMR) system in response to a seek operation in accordance with embodiments described herein.

FIG. 8 illustrates a method in accordance with embodiments described herein. A seek command is generated 810 in a HAMR device. A first current is supplied 820 to a laser diode of the HAMR device in response to the seek command to preheat the laser diode. According to various implementations, the first current is insufficient to cause erasure of data on the media of the HAMR device. In some cases, the first current is a laser bias current ($I_{bias}$). A second current greater than the first current is supplied 830 for writing to a magnetic recording medium of the HAMR device after executing the seek command. The second current may be an operational current, LDI, for example. According to various embodiments, the preheating the laser diode reduces a likelihood of a laser mode hop occurring while writing to the medium.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a non-transitory computer-readable medium and transferred to the processor for execution as is known in the art.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

The invention claimed is:

1. A method, comprising:
generating a seek command in a heat-assisted magnetic recording (HAMR) device;
supplying a first current to a laser diode of the HAMR device in response to the seek command to preheat the laser diode, the first current insufficient to cause erasure of data on media of the HAMR device; and
supplying a second current greater than the first current to the laser diode for writing to a magnetic recording medium of the HAMR device after executing the seek command;
wherein preheating the laser diode reduces a likelihood of a laser mode hop occurring while writing to the medium.

2. The method of claim 1, wherein:
the first current is a laser bias current, $I_{bias}$; and
the second current is an operational current, LDI, wherein an increase from a threshold voltage to $I_{bias}$ is a preheat current, $I_{prh}$, and $I_{ph}/I_{eff}$ is in a range of about 0.5 to about 0.8.

3. The method of claim 1, wherein the first current is supplied substantially simultaneously with a start of the seek command.

4. The method of claim 1, wherein a change in temperature per a temperature pulse when writing to the magnetic recording medium is less than or equal to about 2K.

5. The method of claim 1, wherein a change in temperature per a temperature pulse when writing to the magnetic recording medium is less than or equal to about 1K.

6. The method of claim 1, wherein the first current is supplied a predetermined amount of time after a start of the seek command.

7. The method of claim 1, wherein the first current is supplied upon receipt of the seek command.

8. The method of claim 1, wherein preheating the laser diode reduces a likelihood of a shift in a laser threshold current during a write operation.

9. An apparatus, comprising:
a controller coupled to circuitry configured to provide power to a laser of a write head that heats a heat-assisted recording (HAMR) medium during recording, the controller configured to:
generate a seek command in a heat-assisted magnetic recording device;
supply a first current to a laser diode of the HAMR device in response to the seek command to preheat the laser diode, the first current insufficient to cause erasure of data on media of the heat-assisted magnetic recording device; and
supply a second current greater than the first current to the laser diode for writing to a magnetic recording medium of the device after executing the seek command;
wherein preheating the laser diode reduces a likelihood of a laser mode hop occurring while writing to the medium.

10. The apparatus of claim 9, wherein:
the first current is a laser bias current, $I_{bias}$; and
the second current is an operational current, LDI, wherein an increase from a threshold voltage to $I_{bias}$ is a preheat current, $I_{prh}$, and $I_{ph}/I_{eff}$ is in a range of about 0.5 to about 0.8.

11. The apparatus of claim 9, wherein the first en is supplied substantially simultaneously with a start of the seek command.

12. The apparatus of claim 9, wherein a change in temperature per a temperature pulse when writing to the magnetic recording medium is less than or equal to about 1K.

13. The apparatus of claim 9, wherein a change in temperature per a temperature pulse when writing to the magnetic recording medium is less than or equal to about 2K.

14. The apparatus of claim 9, wherein the first current is supplied a predetermined amount of time after a start of the seek command.

15. The method of claim 9, wherein the first current is supplied upon receipt of the seek command.

16. The method of claim 9, wherein preheating the laser diode reduces a likelihood of a shift in a laser threshold current during a write operation.

17. A method, comprising:
generating a seek command in a heat-assisted magnetic recording (HAMR) device;
supplying a first current to a laser diode of the HAMR device substantially simultaneously with a start of the seek command, the first current insufficient to cause erasure of data on media of the HAMR device; and
supplying a second current greater than the first current to the laser diode for writing to a magnetic recording medium of the HAMR device after executing the seek command;
wherein preheating the laser diode reduces a likelihood of a laser mode hop occurring while writing to the medium.

18. The method of claim 17, wherein:
the first current is a laser bias current, $I_{bias}$; and
the second current is an operational current, LDI, wherein an increase from a threshold voltage to $I_{bias}$ is a preheat current, $I_{prh}$, and $I_{ph}/I_{eff}$ is in a range of about 0.5 to about 0.8.

19. The method of claim 17, wherein a change in temperature per a temperature pulse when writing to the magnetic recording medium is less than or equal to about 1K.

20. The method of claim 17, wherein a change in temperature per a temperature pulse when writing to the magnetic recording medium is less than or equal to about 2K.

* * * * *